(12) United States Patent
Christensen et al.

(10) Patent No.: US 11,621,740 B1
(45) Date of Patent: Apr. 4, 2023

(54) SYSTEMS AND METHODS FOR LOW COMPLEXITY SOFT DATA COMPUTATION

(71) Applicant: L3Harris Technologies, Inc., Melbourne, FL (US)

(72) Inventors: L. Carl Christensen, South Jordan, UT (US); Ihab Francis, South Jordan, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 17/524,551

(22) Filed: Nov. 11, 2021

(51) Int. Cl.
*H04B 1/66* (2006.01)
*H04B 1/7176* (2011.01)
*H04B 1/717* (2011.01)

(52) U.S. Cl.
CPC ........... *H04B 1/662* (2013.01); *H04B 1/7174* (2013.01); *H04B 1/7176* (2013.01)

(58) Field of Classification Search
CPC ..... H04B 1/662; H04B 1/7174; H04B 1/7176
See application file for complete search history.

(56) References Cited

U.S. PATENT DOCUMENTS

| | | | |
|---|---|---|---|
| 2008/0187322 A1* | 8/2008 | Tuchler | H04L 25/4902 398/140 |
| 2018/0019841 A1* | 1/2018 | Rekaya Ben-Othman | H04L 5/0003 |
| 2022/0131614 A1* | 4/2022 | Koss | H04L 7/0075 |

OTHER PUBLICATIONS

Y. Wu, A. Yang, Y. -n. Sun and C. Yang, "An Enhanced Soft Value Calculation for LDPC Coded Pulse-Position-Modulation," in IEEE Communications Letters, vol. 16, No. 5, pp. 745-747, May 2012. (Year: 2012).*

K. J. Quirk and L. B. Milstein, "Optical PPM detection with sample decision photon counting," GLOBECOM '05. IEEE Global Telecommunications Conference, 2005., 2005, pp. 4-pp. 151. (Year: 2005).*

P. Azmi, M. Nasiri-Kenari and J. A. Salehi, "Soft-input decoder for decoding of internally channel coded fiber-optic CDMA communication systems," in IEEE Transactions on Communications, vol. 50, No. 12, pp. 1994-2002, Dec. 2002, (Year: 2002).*

* cited by examiner

*Primary Examiner* — Sam K Ahn
*Assistant Examiner* — Amneet Singh
(74) *Attorney, Agent, or Firm* — Fox Rothschild LLP; Robert J. Sacco; Carol Thorstad-Forsyth (57) ABSTRACT

Systems and methods for operating a communication device. The methods comprise: receiving a carrier signal modulated with a modulation signal comprising a symbol conveyed in a symbol timing window; determining an energy value for each timeslot in the symbol timing window; combining the energy values to determine a combined energy value for each bit of the symbol in a manner in which the combined energy value is penalized if more than one timeslot of the symbol timing window comprises energy contained in the carrier signal; and generating a soft value for each bit of the sequence of bits by combining the combined energy value with a weight value, where the weight value is selected from a plurality of weight values based on a number of timeslots in the symbol timing window which comprises energy contained in the carrier signal.

20 Claims, 10 Drawing Sheets

SYSTEMS AND METHODS FOR LOW COMPLEXITY SOFT DATA COMPUTATION

BACKGROUND

Statement of the Technical Field

The present document concerns computer systems and communication systems. More specifically, the present document concerns systems and methods for low complexity soft data computation.

Description of the Related Art

Digital data can be serially communicated in a data stream by interconnected electronic devices, i.e., data bits are communicated one-by-one in a sequential manner over a single data transfer link. Pulse Position Modulation (PPM) may be employed to encode the digital data stream onto an optical carrier wave. The encoding is achieved by modulating the optical carrier wave such that the digital data bits are conveyed through variations in a time relationship between optical pulses.

The datastream can be transferred as discrete frames of information from the transmitting device to the receiving device. Forward Error Correction (FEC) may be employed to facilitate detection and correction of errors in transmitted data without the need for retransmission. An FEC code is sent along with each discrete frame to facilitate error detection and decoding of encoded data by the receiving device's FEC decoder. Soft data in the form of log likelihood ratios is input into the FEC decoder. Conventional techniques for generating the soft data are computationally complex and resource intensive. The complexity of these conventional techniques increases as the order of PPM modulation increases. At higher PPM orders, the complexity of these conventional techniques can become prohibitively complex as to make the computation impractical.

SUMMARY

This document concerns systems and methods for operating a communication device. The methods comprise: receiving, by a receiver, a carrier signal modulated with a modulation signal comprising a symbol conveyed in a symbol timing window (the symbol comprises a binary number defined by a sequence of bits and the symbol timing window comprises a plurality of timeslots each associated with a respective binary number of a plurality of possible binary numbers for the symbol); processing, by the receiver, the carrier signal to determine an energy value for each timeslot of the plurality of timeslots in the symbol timing window; combining, by the receiver, the energy values to determine a combined energy value for each bit of the sequence of bits in a manner in which the combined energy value is penalized if more than one of said timeslots comprises energy contained in the carrier signal; and generating, by the receiver, a soft value for each bit of the sequence of bits by combining the combined energy value with a weight value. The weight value is selected from a plurality of weight values based on a number of timeslots in the symbol timing window which comprises energy contained in the carrier signal.

The carrier signal comprises an optical signal modulated using PPM. The soft value may comprise an approximate or estimate of a log likelihood value indicating a likelihood that a given bit value of the symbol is one or zero.

The combined energy value may be determined by: adding the energy value for a given timeslot to an input energy value associated with one or more previous timeslots when a given bit value defining a respective one of the possible binary numbers for the symbol equals one; and/or subtracting the energy value for a given timeslot to an input energy value associated with one or more previous timeslots when a given bit value defining a respective one of the possible binary numbers for the symbol equals zero.

In some scenarios, the weight value may be: selected as a first weight value of the plurality of weight values when only one timeslot has energy present in the carrier signal; and selected as a second weight value of the plurality of weight values when more than one timeslot has energy present in the carrier signal. The first weight value is greater than the second weight value. Both the first and second weight values may be positive numbers. Also, a ratio of the first weight value to the second weight value is such that the first weight value is greater than two times larger than the second weight value.

In those or other scenarios, the weight value is selected as the second weight value when two timeslots have energy present in the carrier signal; and is selected as a third weight value of the plurality of weight values when more than two timeslots have energy present in the carrier signal. The second weight value is less than the first weight value. The third weight value is less than the first and second weight values. The third weight value is smaller than the first weight value divided by half the number of timeslots.

The implementing system can comprise a processor and a non-transitory computer-readable storage medium comprising programming instructions that are configured to cause the processor to implement a method for mitigating interference. Alternatively or additionally, the implementing system may include logic circuits (e.g., subtractors), passive circuit components (e.g., resistors, capacitors, switches, delays, etc.) and/or other active circuit components (e.g., transistors, demodulators, modulators, combiners, etc.).

BRIEF DESCRIPTION OF THE DRAWINGS

This disclosure is facilitated by reference to the following drawing figures, in which like numerals represent like items throughout the figures.

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The term "active timeslot" as used herein refers to a timeslot with energy contained or present within a carrier signal. In optical wave applications, the energy comprises light energy and/or light pulse energy.

As noted above, a datastream can be transferred as discrete frames of information from the transmitting device to the receiving device. FEC may be employed to facilitate detection and correction of errors in transmitted data without the need for retransmission. An FEC code is sent along with each discrete frame to facilitate error detection and decoding of encoded data by the receiving device's FEC decoder. Soft data in the form of log likelihood ratios is input into the FEC decoder. Conventional techniques for generating the soft data are computationally complex and resource intensive. The complexity of these conventional techniques increases as the order of PPM modulation increases. At higher PPM orders, the complexity of these conventional techniques can become prohibitively complex as to make the computation impractical.

The present solution overcomes these drawbacks of conventional solutions, and ensures that a higher likelihood is not assigned to one or more bits of a flawed symbol (e.g., a symbol with more than one active PPM timeslot) than a non-flawed symbol (e.g., a symbol with just one active PPM timeslot). The present solution generally involves combining weighted values for each timeslot in a symbol timing window with a penalty for having energy in more than one timeslot of the symbol timing window. More specifically, the present solution comprises: summing the energy in each timeslot of a symbol timing window for each bit; selecting a weight based on the number of timeslots in the symbol timing window which has energy; and multiplying the sum for each bit by the selected weight. The particulars of the present solution will become more evident as the discussion progresses.

Figure 1:
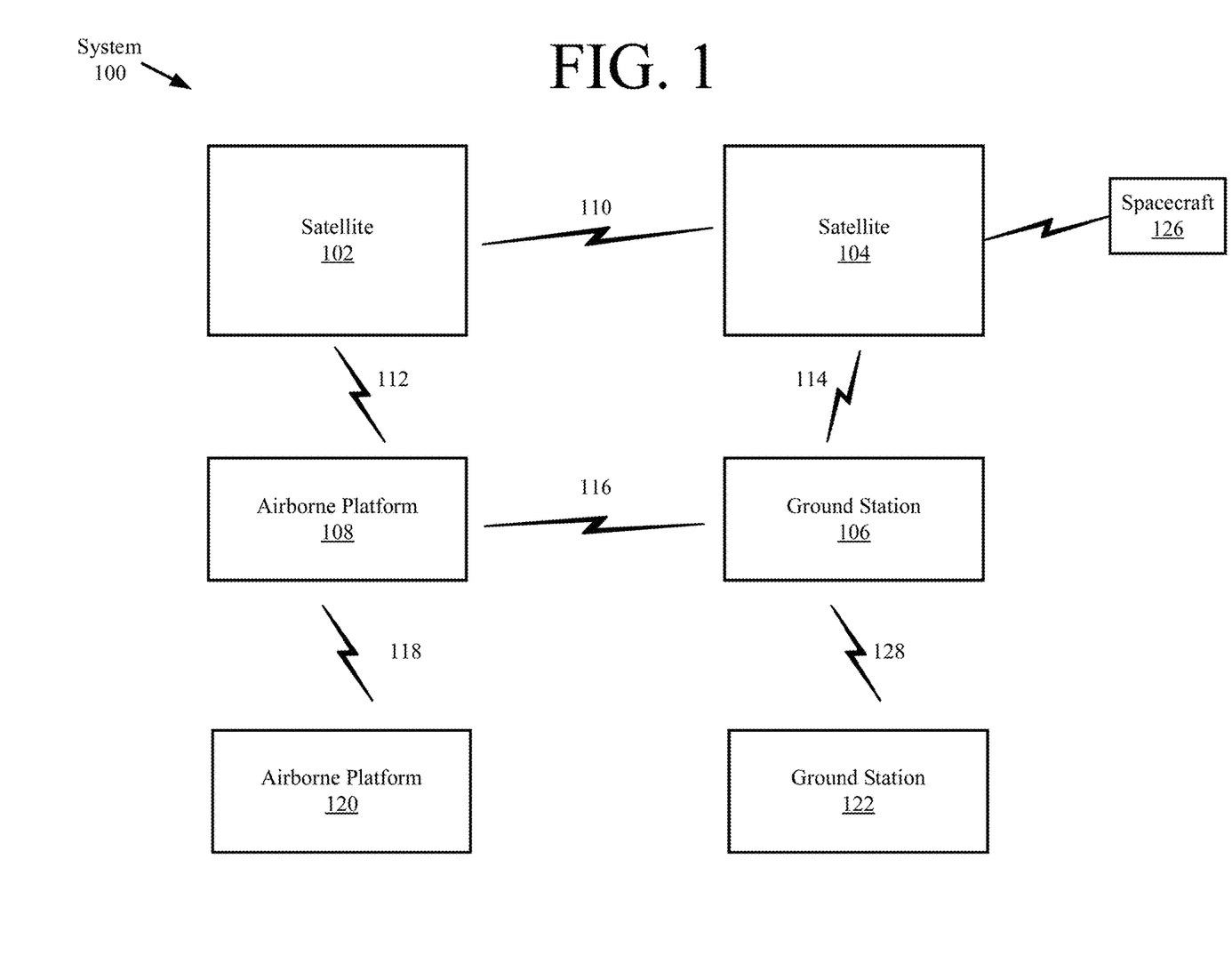
FIG. 1 provides an illustration of a system.

Referring now to FIG. 1, there is provided an illustration of a system 100 implementing the present solution. System 100 comprises satellites 102, 106, ground stations 106, 122, airborne platforms 108, 120 and a spacecraft 126. The listed devices are configured to communicate with each other over communication links 110, 112, 114, 116, 118, 128. As such, each of these devices 102-108, 120, 122, 126 comprises a communication device configured to transmit and receive signals. An illustrative architecture for a communication device is provided in FIGS. 2-3, which will be discussed in detail below.

During operation, the communication devices serially communicate digital data in data streams, i.e., data bits are communicated in a sequential manner over a single data transfer link 110, 112, 114, 116, 118 or 128. A modulation scheme may be employed by the communication devices to encode the digital data stream onto optical carrier waves. This modulation scheme can include, but is not limited to, PPM or other modulation technique with a low duty cycle. In PPM scenarios, the encoding is achieved by modulating the optical carrier waves such that the digital data bits are conveyed through variations in a time relationship between optical pulses.

An error correction scheme may be employed to facilitate detection and correction of errors in transmitted data without the need for retransmission. The error correction scheme can include FEC. An FEC code is sent along with each discrete frame to facilitate error detection and decoding of encoded data by the receiving device's FEC decoder. Soft data in the form of log likelihood ratios is input into the FEC decoder. A novel solution is employed by the receiving device to generate the log likelihood ratios. The novel solution generally involves combining weighted values for each timeslot in a symbol timing window with a penalty for having energy in more than one timeslot of the symbol timing window. More specifically, the novel solution comprises: summing the energy in each timeslot of a symbol timing window for each bit; selecting a weight based on the number of timeslots in the symbol timing window which has energy; and multiplying the sum for each bit by the selected weight. The particulars of the novel solution will become more evident as the discussion progresses.

Figure 2:
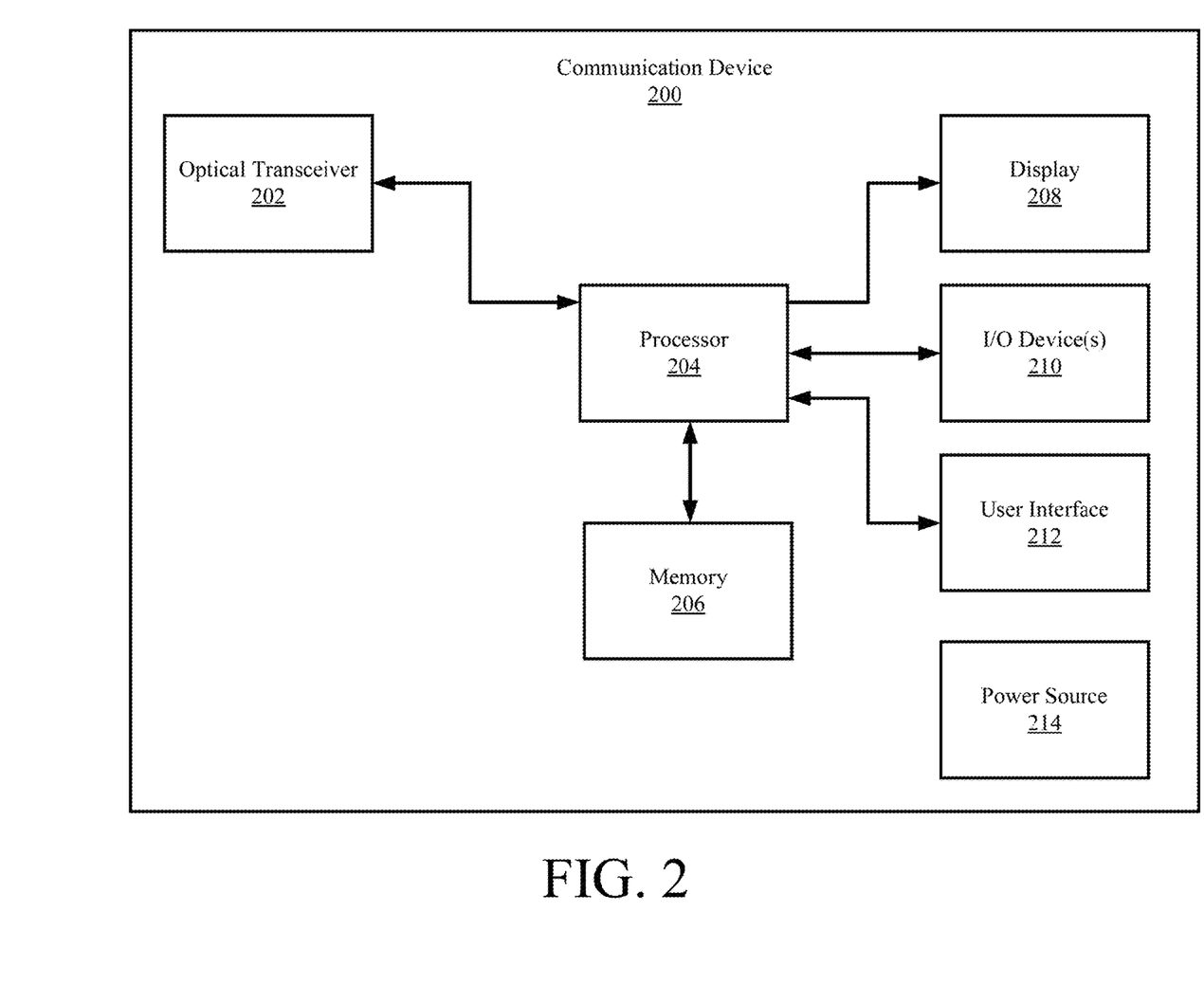
FIG. 2 provides an illustration of a communication device.

An illustrative communication device 200 is provided in FIG. 2 which is configured for carrying out the various methods described herein for low complexity soft data computation. Satellites 102, 104, ground stations 106, 122, airborne platforms 108, 120 and spacecraft 126 of FIG. 1 can comprise communication device 200 of FIG. 2. The communication device 200 can include more or less components than that shown in FIG. 2 in accordance with a given application. For example, communication device 200 can include one or both components 208 and 210. The present solution is not limited in this regard.

As shown in FIG. 2, the communication device 200 comprises an optical transceiver 202, a processor 204, a memory 206, a display 208, Input/Output (I/O) device(s) 210, user interface 212, and a power source 214. The optical transceiver 202 can comprise one or more components such as a processor, an application specific circuit, a programmable logic device, a digital signal processor, or other circuit programmed to perform the functions described herein. The optical transceiver 202 can enable end-to-end communication services in accordance with the present solution. In this regard, the optical transceiver can facilitate communication of data (e.g., voice data and/or media content) from the communication device 200 over a network and/or communications channel (e.g., a satellite communication channel).

The optical transceiver 202 can include, but is not limited to, an optical wireless transceiver and an optical wireless receiver. The optical wireless transceiver 302 is generally configured to convert electrical data signals into optical signals. The optical wireless transceiver 302 is connected to a processor 204 comprising an electronic circuit. During operation, the processor 204 is configured to control the optical wireless transceiver 202 for providing communication services. The processor 204 also facilitates: clock synchronization at a receiving device by including a synchronization word at the start of each frame of data and facilitates clock synchronization at the optical wireless receiver by detecting the synchronization word in received signals; and error correction at the receiving device by encoding each frame of data using an error correction code and including parity bits with each frame.

The memory 206, display 208, user interface 212 and I/O device(s) 210 are also connected to the processor 204. The processor 204 may be configured to collect and store data generated by the I/O device(s) 210 and/or external devices (not shown). The I/O device(s) 210 can include, but are not limited to, a speaker, a microphone, sensor(s) (e.g., a temperature sensor and/or a humidity sensor), and/or a camera. Data stored in memory 206 can include, but is not limited to, one or more look-up tables or databases which facilitate low complexity soft data computation in communication applications. The user interface 212 includes, but is not limited to, a plurality of user depressible buttons that may be used, for example, for entering numerical inputs and selecting various functions of the communication device 200. This portion of the user interface may be configured as a keypad. Additional control buttons and/or rotatable knobs may also be provided with the user interface 212. A power source 214 (e.g., a battery) may be provided for powering the components of the communication device 200. The power source 200 may comprise a rechargeable and/or replaceable battery. Batteries are well known in the art, and therefore will not be discussed here.

The communication device architecture shown in FIG. 2 should be understood to be one possible example of a communication device system which can be used in connection with the various implementations disclosed herein. However, the systems and methods disclosed herein are not limited in this regard and any other suitable communication device system architecture can also be used without limitation. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the illustrative system is applicable to software, firmware, and hardware implementations.

Figure 3:
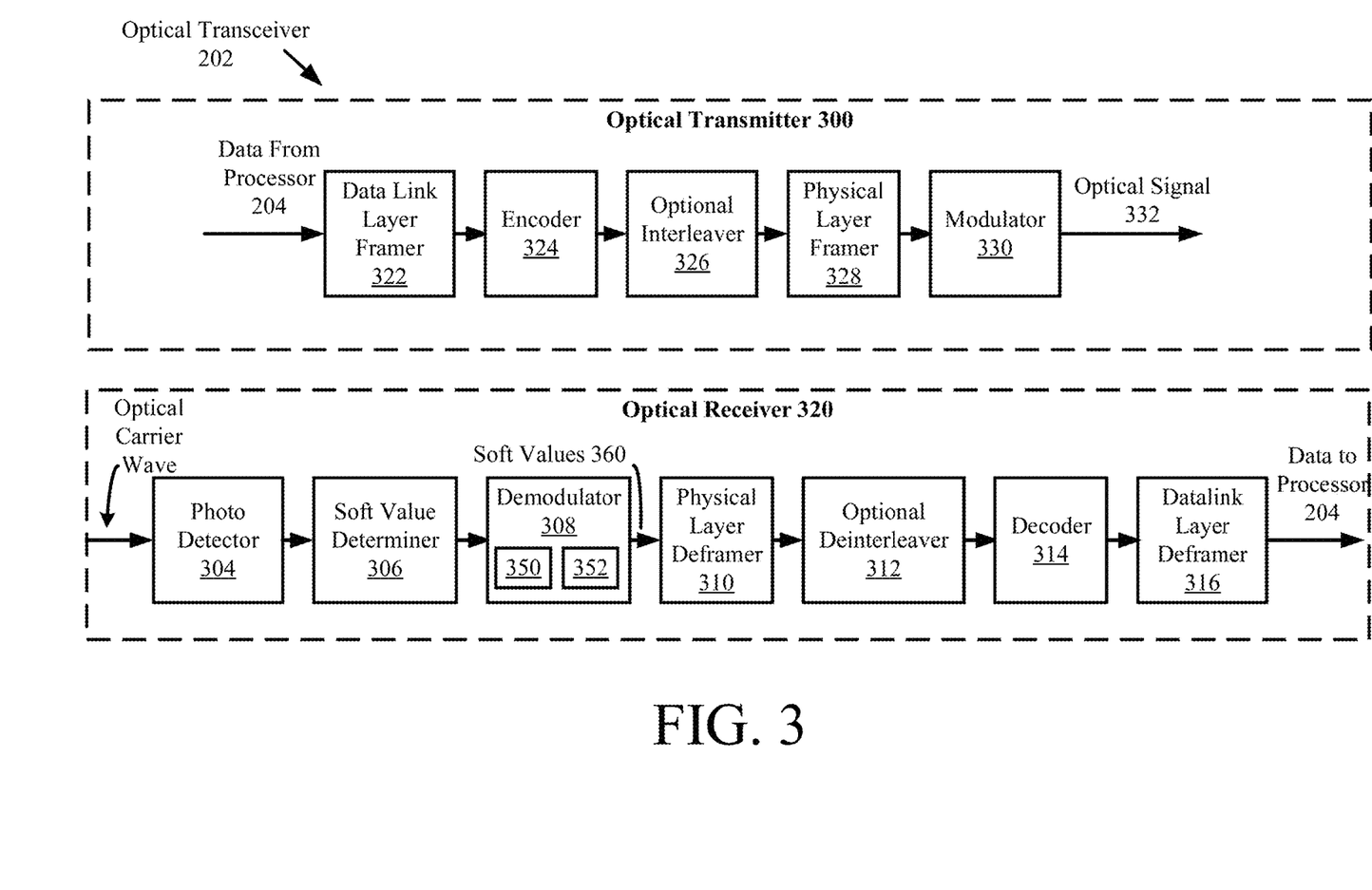
FIG. 3 provides an illustration of an optical transceiver.

Referring now to FIG. 3, there is provided a more detailed diagram of the optical transceiver 202 of FIG. 2. As noted above, the optical transceiver 202 comprises an optical transmitter 300 and an optical receiver 320. The transmitter 300 is configured to receive data from processor 204 and process the same to generate an optical signal 332. The processing is performed by a data link layer framer 322, an encoder 324, an optional interleaver 326, a physical layer framer 328 and a modulator 330.

Figure 4:
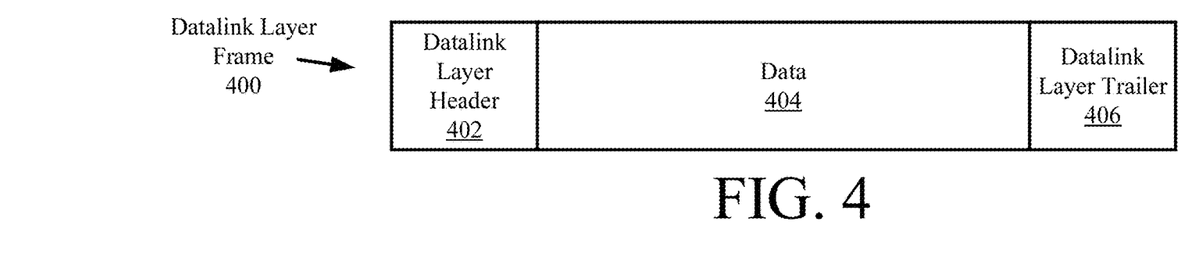
FIG. 4 provides an illustration of a data link layer frame.

The data link layer framer 322 is generally configured to generate data link layer frames. An illustration of a data link layer frame 400 is provided in FIG. 4. The data link layer frame 400 comprises a datalink layer header 402, data 404, and a data link layer trailer 406. Data link layer headers and trailers are well known. The header 402 may comprise a source address, a destination address, and/or control bytes. The trailer 404 may comprise information to ensure that the frame 400 is received intact and undamaged.

Figure 5:
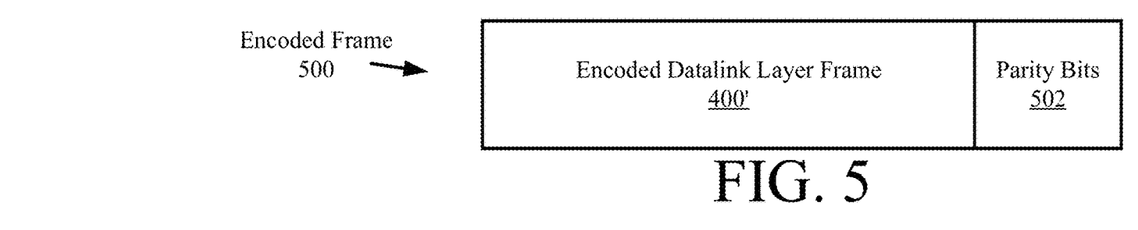
FIG. 5 provides an illustration of an encoded frame.

The data link layer frame 400 is then passed to the encoder 324. The encoder 324 performs operations to generate an encoded frame. An illustration of an encoded frame 500 is provided in FIG. 5. The encoded frame 500 comprises an encoded datalink layer frame 400' and parity bit(s) 502. The encoded datalink layer frame 400' comprises the datalink layer frame 400 which has been converted into a codeblock. The codeblock can include, but is not limited to, a Low-Density Parity-Check Code (LDPC) codeblock. LDPC is well known. Parity bits are well known as generally comprising one or more bits which act as check bit(s) for validating an integrity of the codeblock.

Figure 6:
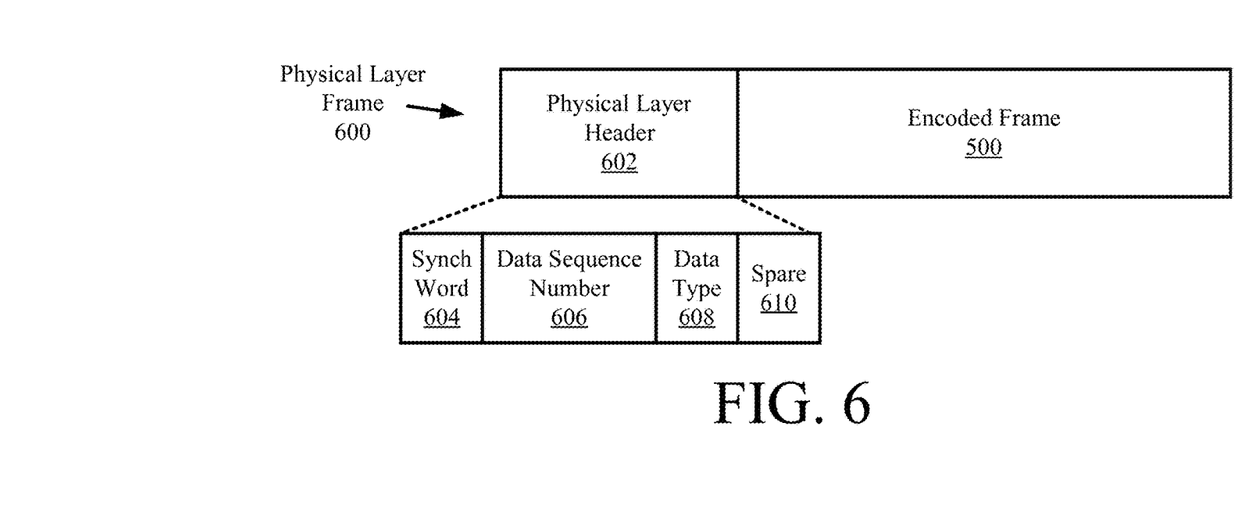
FIG. 6 provides an illustration of a physical layer frame.
Figure 7:
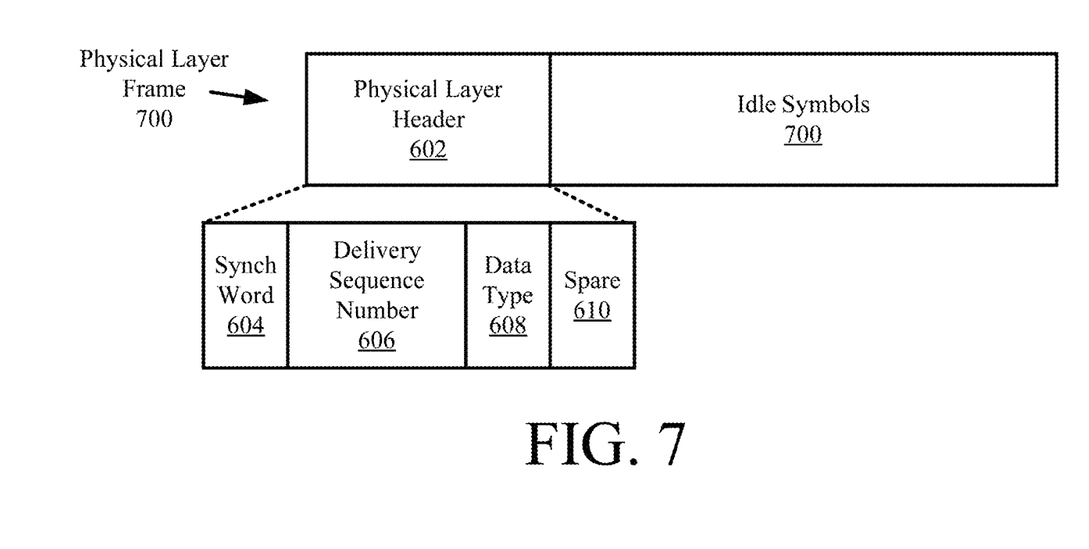
FIG. 7 provides an illustration of another physical layer frame.

The encoded frame 500 is then passed to the physical layer framer 328 via an optional interleaver 326. The physical layer framer 328 performs operations to generate a physical layer frame. An illustration of a physical layer frame 600 is provided in FIG. 6, and an illustration of another physical layer frame 700 is provided in FIG. 7. Both physical layer frames 600, 700 comprise a synchronization word 604, a data sequence number 606, a data type 608, and spare bit(s) 610. The synchronization word 604 comprises a sequence of bits which are known to a receiving device for facilitating synchronization of its clock with the clock of transmitter 300. The other components 606, 608, 610 are well known.

The physical layer frame is then passed to modulator 330. Modulator 330 is configured to perform modulation operations for modulating an optical carrier wave such that the digital data bits of the physical layer frame are conveyed. The modulation technique employed by modulator 330 can include, but is not limited to, PPM and/or other modulation schemes that have low duty cycles or in which the energized time is relatively small compared to the non-energized time (e.g., the energized time ≤10% of the time for the synchronization word and non-energized time is ≥90% of the total time for the synchronization word).

Figure 8:
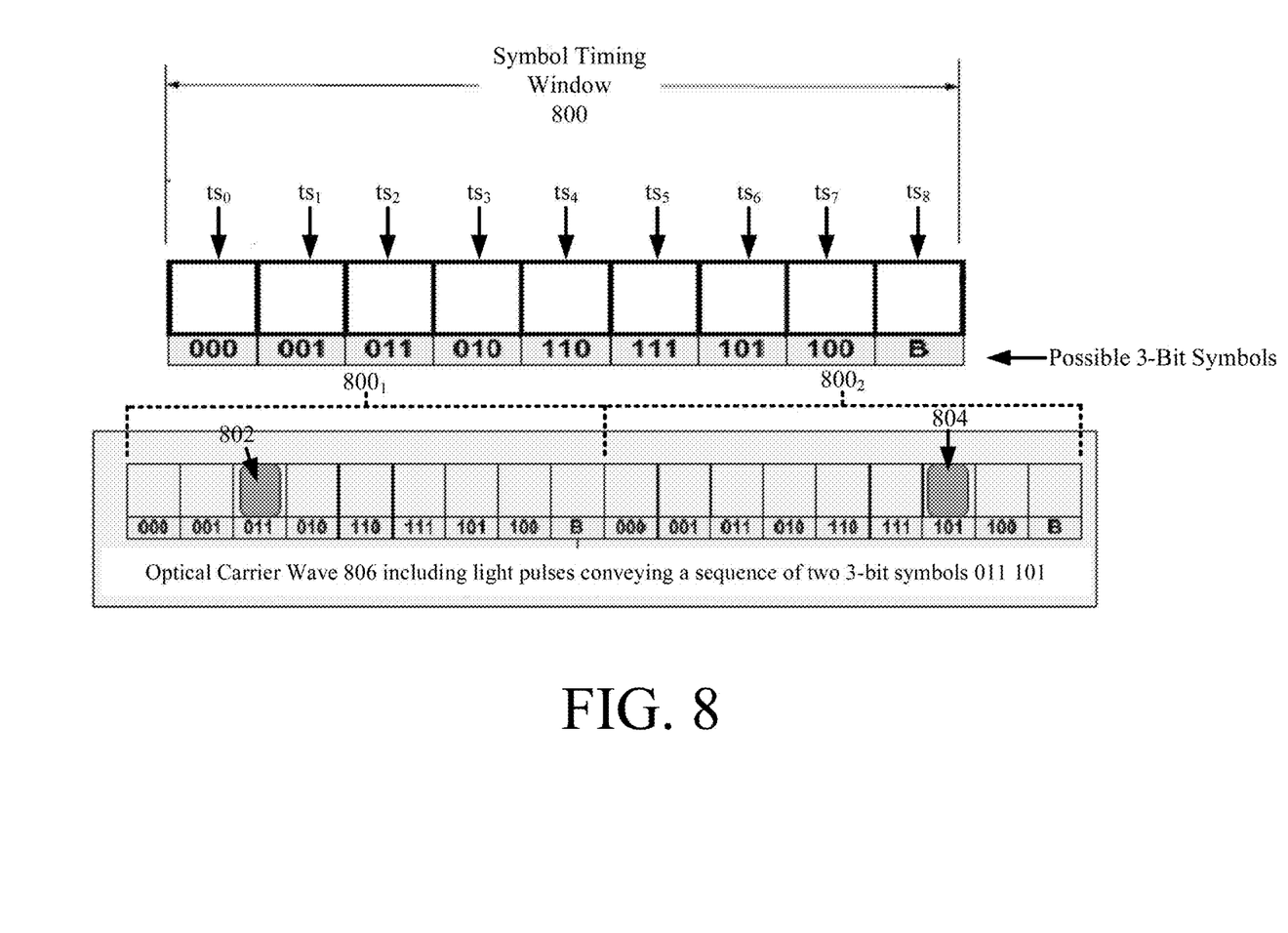
FIG. 8 provides an illustration that is useful for understanding PPM.

An illustration is provided in FIG. 8 that is useful for understanding PPM. In PPM, a digital data stream is encoded onto an optical carrier wave. The encoding is achieved by modulating the optical carrier wave such that the digital data bits are conveyed through variations in a time relationship between optical pulses. For example, a symbol timing window 800 comprises a plurality of timeslots $ts_0$, $ts_1$, $ts_2$, $ts_3$, $ts_4$, $ts_5$, $ts_6$, $ts_7$, $ts_8$ in which a symbol of a synchronization word can be transmitted via a light pulse. Each symbol comprises three bits and can have a value 000, 001, 011, 010, 110, 111, 101, 100. So, if the synchronization word comprises a sequence of symbols 011 101, then an optical carrier wave 806 is generated in which a light pulse 802 is provided in timeslot $ts_2$ of a first symbol timing window $800_1$ and a light pulse 804 is provided in timeslot $ts_6$ of a first symbol timing window $800_2$. $ts_8$ comprises a blinking timeslot that is used for minimum distant to insure there is never two pulses next to each other. The present solution is not limited to the particulars of this example.

Referring back to FIG. 3, an optical carrier wave (e.g., optical carrier wave 806) can be received by the optical receiver 320. The optical carrier wave is processed by a photo detector 304 and the soft value determiner 306 to generate power or intensity values for the timeslots of each symbol timing window. The soft value determiner 306 can include, but is not limited to, an Analog-to-Digital Converter (ADC). Each power or intensity value indicates a probability that the respective timeslot of a symbol timing window is meant or expected to include a light pulse. The power or intensity values are provided to a correlator 350 of the demodulator 308.

The correlator 350 implements a correlation technique for timing synchronization. There are many known techniques for synchronizing and establishing PPM symbol boundaries. Any of these known techniques can be used here. The correlation technique is performed to determine when the synchronization word has been detected with a given degree of likelihood. Once it is determined that the synchronization word has been detected with the given degree of likelihood, operations are performed by the demodulator 308 to demodulate the optical carrier wave for obtaining a data stream. The correlator 350 is shown in FIG. 3 as being part of the demodulator 308. The present solution is not limited in this regard. The correlator 350 can be a separate device from the demodulator 308 and/or comprised in another device other than the demodulator 308.

The demodulator 308 also comprises a soft value determiner 352 that performs operations to determine soft data in the form of log likelihood ratios that are to be provided as inputs into the decoder 314. The log likelihood ratios are generally determined by combining weighted values for each timeslot in a symbol timing window with a penalty for having energy in more than one timeslot of the symbol timing window. More specifically, the soft value determiner 352 performs the following operations: sum the energy in each timeslot of a symbol timing window for each bit; select a weight based on the number of timeslots in the symbol timing window which has energy; and multiply the sum for each bit by the selected weight to generate soft values 360. The particulars of the present solution will become more evident as the discussion progresses. The soft values 360 are then passed to the decoder 314 via the physical layer deframer 310 and optional deinterleaver 312. In some scenarios, a positive soft value can indicate that there is a probability that the bit value is a one, and a negative soft value can indicate that there is a probability that the bit value is a zero. In other scenarios, a negative soft value can indicate that there is a probability that the bit value is a one, and a positive soft value can indicate that there is a probability that the bit value is a zero. In the latter case, the adding and subtracting of the energy levels is the opposite of what is performed in the earlier case.

The data stream is then passed to the physical layer deframer 310 where each physical layer frame is extracted from the data stream and processed to remove the physical layer header therefrom to obtain an encoded frame. The encoded frame is passed to the decoder 314 via an optional deinterleaver. At the decoder 314, the encoded frame is decoded using the log likelihood ratios generated by soft value determiner 352 to obtain the datalink layer frame. The datalink layer frame is passed to the data link layer deframer 316 where the data is extracted therefrom. The data is then provided to processor 204.

Figure 9:
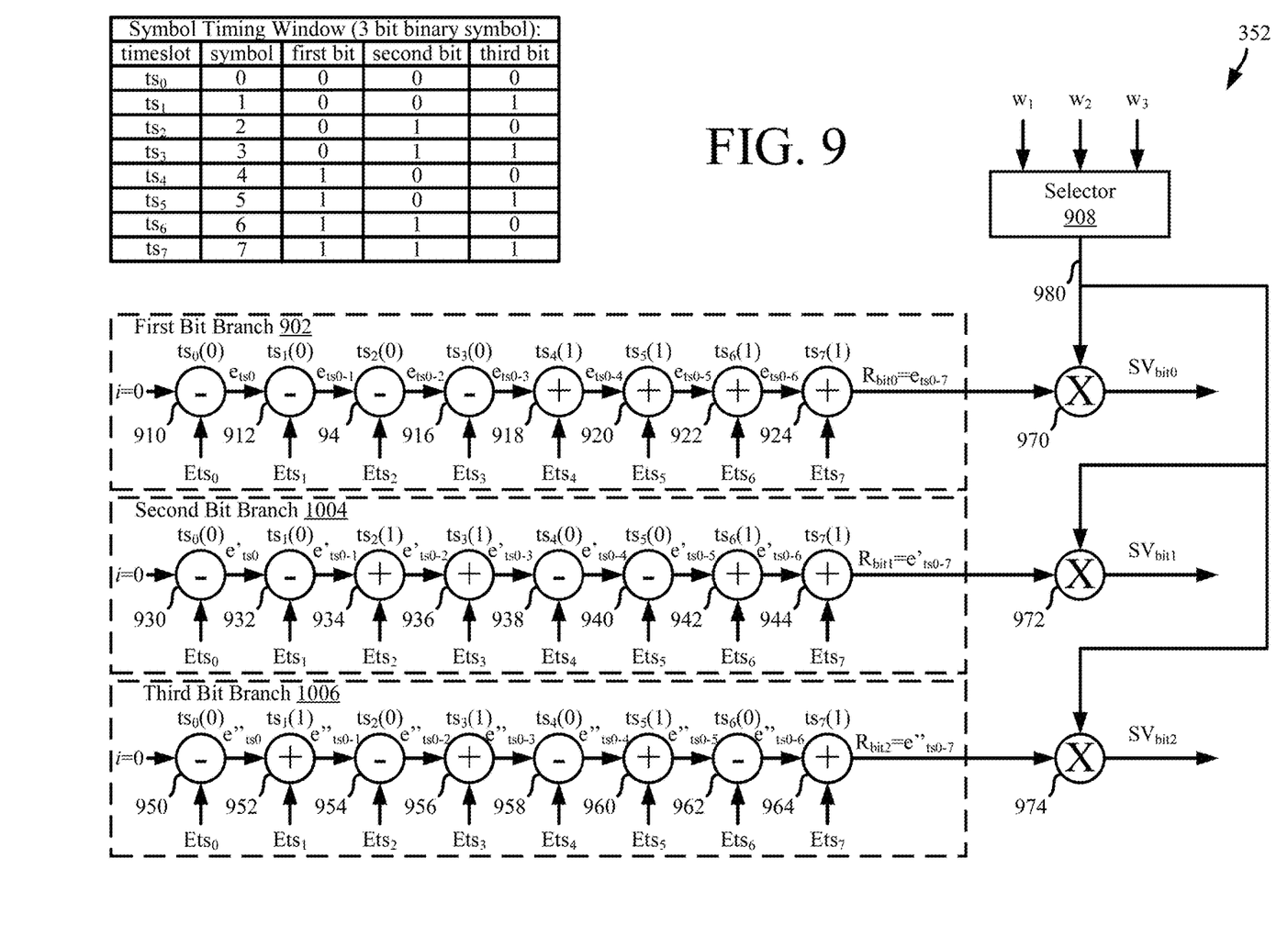
FIGS. 9-10 each provide an illustration that is useful for understanding operations for low complexity soft data computations.

Referring now to FIG. 9, there is provided an illustration that is useful for understanding operations by soft value determiner 352 of optical receiver 320. As noted above, these operations generally involve generating a soft value for each bit (e.g., bit0, bit1, bit2) of a given symbol (e.g., a 3 bit symbol) by combining weighted energy values for the timeslots (e.g., timeslots $ts_0$, $ts_1$, $ts_2$, $ts_3$, $ts_4$, $ts_5$, $ts_6$, $ts_7$, $ts_8$ of FIG. 8) in a symbol timing window (e.g., symbol timing window 800 of FIG. 8) with a penalty for having energy in more than one timeslot of the symbol timing window. The soft values can comprise approximations or estimates of log likelihood values. The energy values can comprise the outputs of soft determiner 306 of FIG. 3.

As shown in FIG. 9, the soft value determiner 352 comprises a plurality of operational branches. The total number of operational branches depends on the number of bits defining the given symbol. For example, if the given symbol is expressed as a four-bit binary number, then four operational branches are provided (one branch for each of the four bits). In contrast, if the given symbol is expressed as a three-bit binary number, then three operational branches are provided as shown in FIG. 9 (one branch for each of the three bits). The present solution is not limited to the particulars of these examples.

In the scenarios where the given symbol is expressed as a three-bit binary number, the operational branches include a first bit branch 902, a second bit branch 904, and a third bit branch 906. The first bit branch 902 generates a soft value $SV_{bit0}$ for the first bit bit0 of the given symbol. The second branch 904 generates a soft value $SV_{bit1}$ for the second bit bit1 of the given symbol. The third branch 906 generates a soft value $SV_{bit2}$ for the third bit bit2 of the given symbol. Each of the branches comprises a set of combiners 910-926, 930-946 or 950-966 configured to add and/or subtract energy levels present in the timeslots of a given symbol timing window within the optical carrier wave, where the addition and subtraction operations are selected based on the bit values associated with the timeslots of the given symbol timing window. If the bit value associated with a given timeslot is zero, then the energy level for the given timeslot is subtracted from an initialization value (e.g., i=0) or the combined energy level(s) of the other previous timeslot(s). For example, since the first bit value of the three-bit symbol for timeslot $ts_0$ is zero, the energy level of timeslot $ts_2$ is subtracted from the combined energy levels of other previous timeslots $ts_0$, $ts_1$. The present solution is not limited to the particulars of this example. In contrast, if the bit value associated with a given timeslot is one, then the energy level for the given timeslot is added to the initialization value or the combined energy level(s) of other previous timeslot(s). For example, since the first bit value of the three-bit symbol for timeslot $ts_4$ is one, the energy level for timeslot $ts_4$ is added to the combined energy levels of previous timeslots $ts_0$, $ts_1$, $ts_2$, $ts_3$. The present solution is not limited to the particulars of this example.

With reference to the first bit branch 902, generation of the soft value $SV_{bit0}$ is facilitated by: subtracting the energy level $E_{ts0}$ of timeslot $ts_0$ from the initialization value i via subtractor 910 to produce energy value $e_{ts0}$; subtracting the energy level $E_{ts1}$ of timeslot $ts_1$ from energy value $e_{ts0}$ via subtractor 1012 to produce energy value $e_{ts0-1}$; subtracting the energy level $E_{ts2}$ of timeslot $ts_2$ from energy value $e_{ts0-1}$ via subtractor 1014 to produce energy value $e_{ts0-2}$; subtracting the energy level $E_{ts3}$ of timeslot $ts_3$ from energy value $e_{ts0-2}$ via subtractor 916 to produce energy value $e_{ts0-3}$; adding the energy level $E_{ts4}$ of timeslot $ts_4$ to energy value $e_{ts0-3}$ via adder 918 to produce energy value $e_{ts0-4}$; adding the energy level $E_{ts5}$ of timeslot $ts_5$ to energy value $e_{ts0-4}$ via adder 920 to produce energy value $e_{ts0-5}$; adding the energy level $E_{ts6}$ of timeslot $ts_6$ to energy value $e_{ts0-5}$ via adder 922 to produce energy value $e_{ts0-6}$; adding the energy level $E_{ts7}$ of timeslot $ts_7$ to energy value $e_{ts0-6}$ via adder 924 to produce energy value $e_{ts0-7}$; and subtracting the energy level $E_{ts8}$ of timeslot $ts_8$ from energy value $e_{ts0-7}$ via subtractor 1026 to produce energy value $e_{ts0-8}$. The energy levels $E_{ts1}, \ldots, E_{ts8}$ can comprise the outputs of soft determiner 306 of FIG. 3 (e.g., $SV_{ts1}, \ldots, SV_{tsN}$ of FIG. 9).

The output of the first bit branch 902 is $R_{bit0}$ which is equal to energy level $e_{ts0-8}$. $R_{bit0}$ is provided to multiplier 970 where it is multiplied by a weight $w_1$, $w_2$ or $w_3$ to produce $SV_{bit0}$. $SV_{bit0}$ may comprise an approximation or estimate of a log likelihood value indicating a likelihood that the first bit value for the three-bit symbol of the given symbol timing window that was conveyed via the optical carrier wave is a one or zero.

With reference to the second bit branch 904, generation of the soft value $SV_{bit1}$ is facilitated by: subtracting the energy level $E_{ts0}$ of timeslot $ts_0$ from the initialization value i via subtractor 930 to produce energy value $e'_{ts0}$; subtracting the energy level $E_{ts1}$ of timeslot $ts_1$ from energy value $e'_{ts0}$ via subtractor 932 to produce energy value $e'_{ts0-1}$; adding the energy level $E_{ts2}$ of timeslot $ts_2$ to energy value $e_{ts0-1}$ via adder 934 to produce energy value $e'_{ts0-2}$; adding the energy level $E_{ts3}$ of timeslot $ts_3$ to energy value $e'_{ts0-2}$ via adder 936 to produce energy value $e'_{ts0}$-s; subtracting the energy level $E_{ts4}$ of timeslot $ts_4$ from energy value $e'_{ts0-3}$ via subtractor 938 to produce energy value $e'_{ts0-4}$; subtracting the energy level $E_{ts5}$ of timeslot $ts_5$ from energy value $e'_{ts0-4}$ via subtractor 940 to produce energy value $e'_{ts0-5}$; adding the energy level $E_{ts6}$ of timeslot $ts_6$ to energy value $e'_{ts0-5}$ via adder 942 to produce energy value $e'_{ts0-6}$; adding the energy level $E_{ts7}$ of timeslot $ts_7$ to energy value $e'_{ts0-6}$ via adder 944 to produce energy value $e'_{ts0-7}$; and subtracting the energy level $E_{ts8}$ of timeslot $ts_8$ from energy value $e'_{ts0-7}$ via subtractor 946 to produce energy value $e'_{ts0-8}$. The output of the second bit branch 904 is $R_{bit1}$ which is equal to energy level $e'_{ts0-8}$. $R_{bit1}$ is provided to multiplier 972 where it is multiplied by a weight $w_1$, or $w_3$ to produce $SV_{bit1}$. $SV_{bit1}$ may comprise an approximation or estimate of a log likelihood value indicating a likelihood that the second bit value for the three-bit symbol of the given symbol timing window that was conveyed via the optical carrier wave is a one or zero.

With reference to the third bit branch 906, generation of the soft value $SV_{bit2}$ is facilitated by: subtracting the energy level $E_{ts0}$ of timeslot $ts_0$ from the initialization value i via subtractor 950 to produce energy value $e''ts_0$; adding the energy level $E_{ts1}$ of timeslot $ts_1$ to energy value $e''ts_0$ via adder 952 to produce energy value $e''ts_{0-1}$; subtracting the energy level $E_{ts2}$ of timeslot $ts_2$ from energy value $e''ts_{0-4}$ via subtractor 954 to produce energy value $e''ts_{0-2}$; adding the energy level $E_{ts3}$ of timeslot $ts_3$ to energy value $e''ts_{0-2}$ via adder 956 to produce energy value $e''ts_{0-3}$; subtracting the energy level $E_{ts4}$ of timeslot $ts_4$ from energy value $e''ts_{0-3}$ via subtractor 958 to produce energy value $e''ts_{0-4}$; adding the energy level $E_{ts5}$ of timeslot $ts_5$ to energy value $e''ts_{0-4}$ via adder 960 to produce energy value $e''ts_{0-5}$; subtracting the energy level $E_{ts6}$ of timeslot $ts_6$ from energy value $e''ts_{0-5}$ via subtractor 962 to produce energy value $e''ts_{0-6}$; adding the energy level $E_{ts7}$ of timeslot $ts_7$ to energy value $e''ts_{0-6}$ via adder 964 to produce energy value $e''ts_{0-7}$; and adding the energy level $E_{ts8}$ of timeslot $ts_8$ to energy value $e''ts_{0-7}$ via adder 966 to produce energy value $e''ts_{0-8}$. The output of the third bit branch 906 is $R_{bit2}$ which is equal to energy level $e''ts_{0-8}$. $R_{bit2}$ is provided to multiplier 974 where it is multiplied by a weight $w_1$, $w_2$ or $w_3$ to produce $SV_{bit1}$. $SV_{bit2}$ may comprise an approximation or estimate of a log likelihood value indicating a likelihood that the third bit value for the three-bit symbol of the given symbol timing window that was conveyed via the optical carrier wave is a one or zero.

The weight value $w_1$, $w_2$ or $w_3$ is provided from selector 908 to the multipliers 970-974 via line 980. Selector 908 selects one of the weight values $w_1$, $w_2$, $w_3$ based on the number of "active" timeslots in the given symbol timing window (i.e., the total number of timeslots comprising energy). For example, selector 908 selects weight $w_1$ when there is only one active timeslot in the given symbol timing window, selects weight $w_2$ when there are two active timeslots in the given symbol timing window of the optical carrier wave, and selects weight $w_3$ when there are more than two active timeslots in the given symbol timing window of the optical carrier wave.

The weights have values selected such that the soft values $SV_{bit0}$, $SV_{bit1}$, $SV_{bit2}$ are penalized when there is more than one active timeslot in the given symbol timing window of the optical carrier wave. In this regard, weight $w_1$ has a value greater than weights $w_2$ and $w_3$. Weight $w_2$ has a value less than weight $w_1$ and greater than weight $w_3$. Weight $w_3$ has a value less than weights $w_1$ and $w_2$. All of the weights may have a positive value. For example, weight $w_1$ has a value of two, weight $w_2$ has a value of one half, and weight $w_3$ has a value of one fourth. The present solution is not limited in this regard. Any number of weights can be employed to provide a desired amount of penalization for the soft values in accordance with any given number of active timeslots in a symbol timing window. Thus, in some scenarios, the selector can select a weight from N weights $w_N$, where N is any integer greater than one. The weight value is decreased as the number of active timeslots increases.

Figure 10:
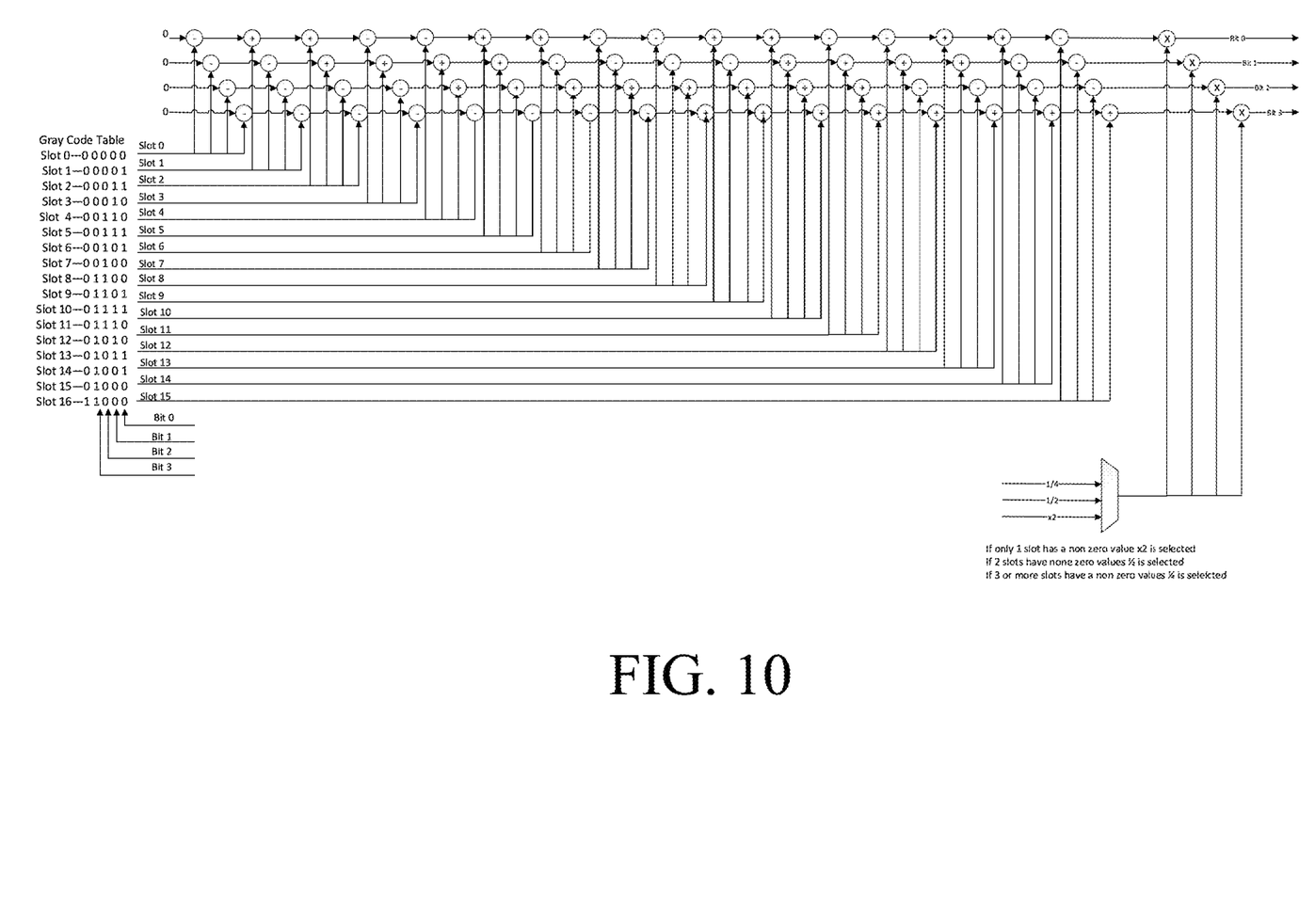

The present solution is not limited to the binary bit scheme used in relation to FIG. 9. In other scenarios, a gray code may be employed to encode the symbols in a binary bit format. The gray code is well known. An illustration of another implementation of the soft symbol determination process of the present solution is provided in FIG. 10. In FIG. 10, a gray code is employed for encoding symbols as four-bit binary numbers.

Figure 11:
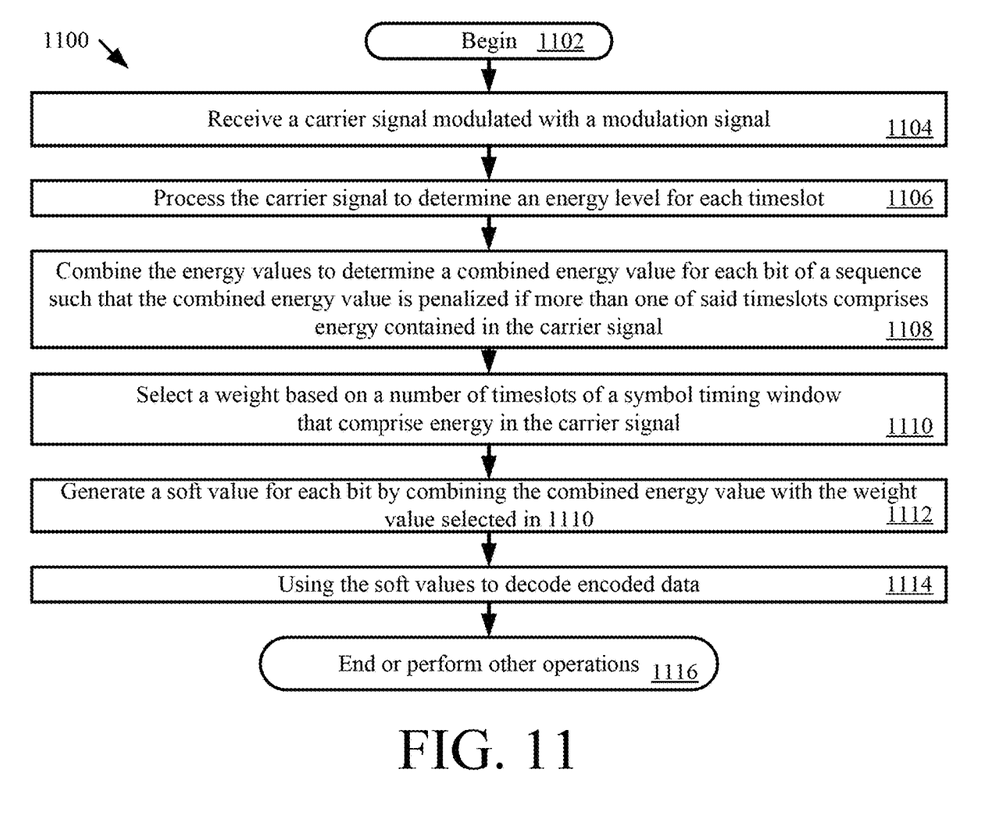
FIG. 11 provides a flow diagram of an illustrative method for soft data computations.

Referring now to FIG. 11, there is provided a flow diagram of an illustrative method 1100 for soft data computation. Method 1100 can be performed by soft value determiner 352 of FIG. 3. Method 1100 begins with 1102 and continues with 1104 where a receiver (e.g., optical receiver 320 of FIG. 3) receives a carrier signal (e.g., carrier signal 800 of FIG. 8) modulated with a modulation signal comprising a symbol (e.g., symbol 011 or 101 of FIG. 8) conveyed in a symbol timing window (e.g., symbol timing window 800 of FIG. 8). The carrier signal may include, but is not limited to, an optical signal. The modulation technique employed may include, but is not limited to, PPM. The symbol comprises a binary number defined by a sequence of bits (e.g., binary number 000, 001, 010, 110, . . . , 100). The symbol timing window comprises a plurality of timeslots (e.g., timeslots $ts_0$, $ts_1$, $ts_2$, $ts_3$, $ts_4$, $ts_5$, $ts_6$, $ts_7$, $ts_8$ of FIG. 8). Each timeslot is associated with a respective binary number of a plurality of possible binary numbers for the symbol.

In 1106, the receiver processes the carrier signal to determine an energy value for each timeslot of the plurality of timeslots in the symbol timing window. In some scenarios, a photo detector (e.g., photo detector 304 of FIG. 3) and a soft value determiner (e.g., soft value determiner 306 of FIG. 3) are used to obtain the energy values.

In 1108, the receiver performs operations to combine the energy values to determine a combined energy value (e.g., $R_{bit0}$, $R_{bit1}$, $R_{bit2}$ of FIG. 9) for each bit of the sequence of bits in a manner in which the combined energy value is penalized if more than one of the timeslots comprises energy contained in the carrier signal. The combined energy value is determined by: adding the energy value for a given timeslot of the plurality of timeslots to an input energy value associated with one or more previous timeslots of the plurality of timeslots when a given bit value of a plurality of bit values defining a respective one of the plurality of possible binary numbers for the symbol equals one; or subtracting the energy value for a given timeslot of the plurality of timeslots to an input energy value associated with one or more previous timeslots of the plurality of timeslots when a given bit value of a plurality of bit values defining a respective one of the plurality of possible binary numbers for the symbol equals zero.

In 1110, the receiver selects a weight value from a plurality of weight values (e.g., $w_1$, $w_2$, and $w_3$ of FIG. 10) based on a number of timeslots in the symbol timing window which comprises energy contained in the carrier signal. The weight value may be: selected as a first weight value (e.g., $w_1$) when only one of the timeslots has energy present in the carrier signal; as a second weight value (e.g., $w_2$) when more than one timeslot has energy present in the carrier signal. The first weight value is greater than the second weight value. Both the first and second weight values may be positive numbers. The weight value may be: selected as the second weight value when two timeslots have energy present in the carrier signal; and as a third weight value when more than two timeslots has energy present in the carrier signal. The third weight value is less than the first and second weight values.

In 1112, the receiver generates a soft value (e.g., $SV_{bit0}$, $SV_{bit1}$, $SV_{bit2}$ of FIG. 9) for each bit of the sequence of bits by combining the combined energy value with the selected weight value (e.g., $w_1$, $w_2$ or $w_3$ of FIG. 9). The soft value can include, but is not limited to, an approximation or estimate of a log likelihood value indicating a likelihood that a given bit value of the symbol is one or zero The soft values are then used to decode encoded data (e.g., FEC encoded data). Subsequently, 1116 is performed where method 1100 ends or other operations are performed.

Figure 12:
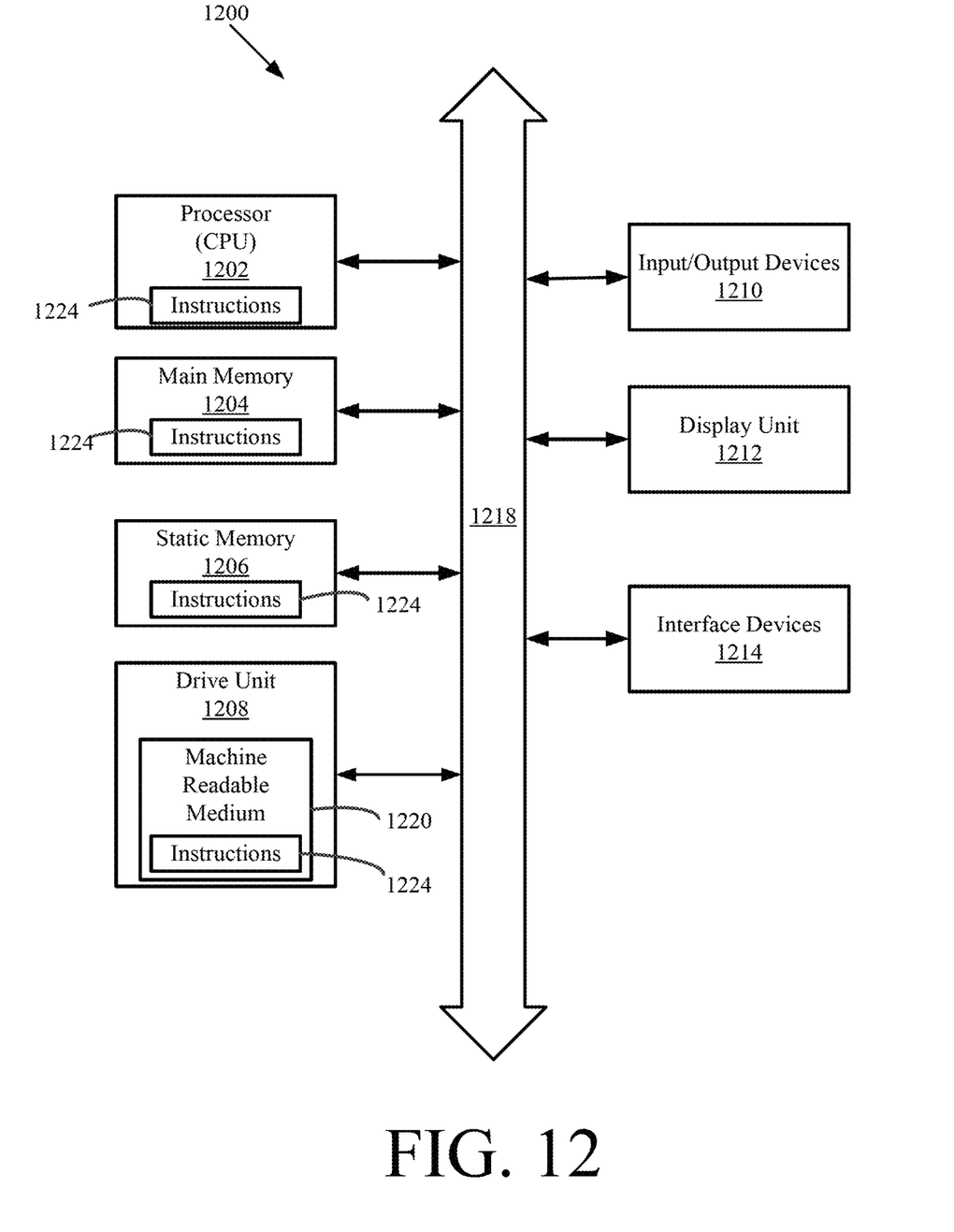
FIG. 12 provides an illustration of an architecture for a computing device.

Referring now to FIG. 12, there is shown a hardware block diagram comprising an example computer system 1200 that can be used for implementing all or part of network nodes 102-108 of FIG. 1, communication device 200 of FIG. 2, optical transceiver 202 of FIG. 3, optical receiver 320, and/or soft value determiner 352 of FIG. 3. The machine can include a set of instructions which are used to cause the circuit/computer system to perform any one or more of the methodologies discussed herein. While only a single machine is illustrated in FIG. 12, it should be understood that in other scenarios the system can be taken to involve any collection of machines that individually or jointly execute one or more sets of instructions as described herein.

The computer system 1200 is comprised of a processor 1202 (e.g., a Central Processing Unit (CPU)), a main memory 1204, a static memory 1206, a drive unit 1208 for mass data storage and comprised of machine readable media 1220, input/output devices 1210, a display unit 1212 (e.g., a Liquid Crystal Display (LCD)) or a solid state display, and one or more interface devices 1214. Communications among these various components can be facilitated by means of a data bus 1218. One or more sets of instructions 1224 can be stored completely or partially in one or more of the main memories 1204, static memory 1206, and drive unit 1208. The instructions can also reside within the processor 1202 during execution thereof by the computer system. The input/output devices 1210 can include a keyboard, a multi-touch surface (e.g., a touchscreen) and so on. The interface device(s) 1214 can be comprised of hardware components and software or firmware to facilitate an interface to external circuitry. For example, in some scenarios, the interface devices 1214 can include one or more Analog-to-Digital (A/D) converters, Digital-to-Analog (D/A) converters, input voltage buffers, output voltage buffers, voltage drivers and/or comparators. These components are wired to allow the computer system to interpret signal inputs received from external circuitry and generate the necessary control signals for certain operations described herein.

The drive unit 1208 can comprise a machine readable medium 1220 on which is stored one or more sets of instructions 1224 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, Electrically Erasable Programmable Read-Only Memory (EEPROM) and flash memory devices. A tangible medium as described herein is one that is non-transitory insofar as it does not involve a propagating signal.

Computer system 1200 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The above described solution for soft data computation has many novel features. The present solution: universally applies to all bits in a symbol, a reward or penalty based on the number of active timeslots in the symbol timing windows; and has relatively low computation complexity. While some individual bits may be penalized a bit more than others, the system never gives a higher probability to a flawed symbol. Gray code encoding or other encoding techniques can be used to optimize performance of the present solution by limiting the damage done by slight timing errors (e.g., when two adjacent timeslots both get part of the signal).

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for operating a communication device, comprising:
   receiving, by a receiver, a carrier signal modulated with a modulation signal comprising a symbol conveyed in a symbol timing window, the symbol comprising a binary number defined by a sequence of bits and the symbol timing window comprising a plurality of timeslots each associated with a respective binary number of a plurality of possible binary numbers for the symbol;
   processing, by the receiver, the carrier signal to determine an energy value for each timeslot of the plurality of timeslots in the symbol timing window;
   combining, by the receiver, the energy values to determine a combined energy value for each bit of the sequence of bits in a manner in which the combined energy value is penalized if more than one of said timeslots comprises energy contained in the carrier signal; and
   generating, by the receiver, a soft value for each bit of the sequence of bits by combining the combined energy value with a weight value, the weight value being selected from a plurality of weight values based on a number of timeslots in the symbol timing window which comprises energy contained in the carrier signal.

2. The method according to claim 1, wherein the carrier signal comprises an optical signal modulated using pulse position modulation.

3. The method according to claim 1, wherein the soft value comprises an approximation or estimate of a log likelihood value indicating a likelihood that a given bit value of the symbol is one or zero.

4. The method according to claim 1, wherein the combined energy value is determined by adding the energy value for a given timeslot of the plurality of timeslots to an input energy value associated with one or more previous timeslots of the plurality of timeslots when a given bit value of a plurality of bit values defining a respective one of the plurality of possible binary numbers for the symbol equals one.

5. The method according to claim 1, wherein the combined energy value is determined by subtracting the energy value for a given timeslot of the plurality of timeslots to an input energy value associated with one or more previous timeslots of the plurality of timeslots when a given bit value of a plurality of bit values defining a respective one of the plurality of possible binary numbers for the symbol equals zero.

6. The method according to claim 1, wherein the weight value is selected as a first weight value of the plurality of weight values when only one of said plurality of timeslots has energy present in the carrier signal.

7. The method according to claim 6, wherein the weight value is selected as a second weight value of the plurality of weight values when more than one of the plurality of timeslots has energy present in the carrier signal.

8. The method according to claim 7, wherein the first weight value is greater than the second weight value.

9. The method according to claim 8, wherein both the first and second weight values are positive numbers.

10. The method according to claim 7, wherein the weight value is selected as the second weight value when two of the plurality of timeslots have energy present in the carrier signal and is selected as a third weight value of the plurality of weight values when more than two of the plurality of timeslots has energy present in the carrier signal, the second weight value being less than the first weight value and the third weight value being less than the first and second weight values.

11. A system, comprising:
   a processor;
   a non-transitory computer-readable storage medium comprising programming instructions that are configured to cause the processor to implement a method for operating a communication device, wherein the programming instructions comprise instructions to:
      receive a carrier signal modulated with a modulation signal comprising a symbol conveyed in a symbol timing window, the symbol comprising a binary number defined by a sequence of bits and the symbol timing window comprising a plurality of timeslots each associated with a respective binary number of a plurality of possible binary numbers for the symbol;
      process the carrier signal to determine an energy value for each timeslot of the plurality of timeslots in the symbol timing window;
      combine the energy values to determine a combined energy value for each bit of the sequence of bits in a manner in which the combined energy value is penalized if more than one of said timeslots comprises energy contained in the carrier signal; and
      generate a soft value for each bit of the sequence of bits by combining the combined energy value with a weight value, the weight value being selected from a plurality of weight values based on a number of timeslots in the symbol timing window which comprises energy contained in the carrier signal.

12. The system according to claim 11, wherein the carrier signal comprises an optical signal modulated using pulse position modulation.

13. The system according to claim 11, wherein the soft value comprises an approximation or estimate of a log likelihood value indicating a likelihood that a given bit value of the symbol is one or zero.

14. The system according to claim 11, wherein the combined energy value is determined by adding the energy value for a given timeslot of the plurality of timeslots to an input energy value associated with one or more previous timeslots of the plurality of timeslots when a given bit value of a plurality of bit values defining a respective one of the plurality of possible binary numbers for the symbol equals one.

15. The system according to claim 11, wherein the combined energy value is determined by subtracting the energy value for a given timeslot of the plurality of timeslots to an input energy value associated with one or more previous timeslots of the plurality of timeslots when a given bit value of a plurality of bit values defining a respective one of the plurality of possible binary numbers for the symbol equals zero.

16. The system according to claim 11, wherein the weight value is selected as a first weight value of the plurality of weight values when only one of said plurality of timeslots has energy present in the carrier signal.

17. The system according to claim 16, wherein the weight value is selected as a second weight value of the plurality of weight values when more than one of the plurality of timeslots has energy present in the carrier signal.

18. The system according to claim 17, wherein the first weight value is greater than the second weight value.

19. The system according to claim 18, wherein both the first and second weight values are positive numbers.

20. The system according to claim 17, wherein the weight value is selected as the second weight value when two of the plurality of timeslots have energy present in the carrier signal and is selected as a third weight value of the plurality of weight values when more than two of the plurality of timeslots has energy present in the carrier signal, the second weight value being less than the first weight value and the third weight value being less than the first and second weight values.

* * * * *